Oct. 1, 1968          G. B. WAGENFELD          3,403,409
WOMEN'S HEAD-DRESS AND METHOD OF MAKING SAME
Filed Oct. 26, 1966          3 Sheets-Sheet 1
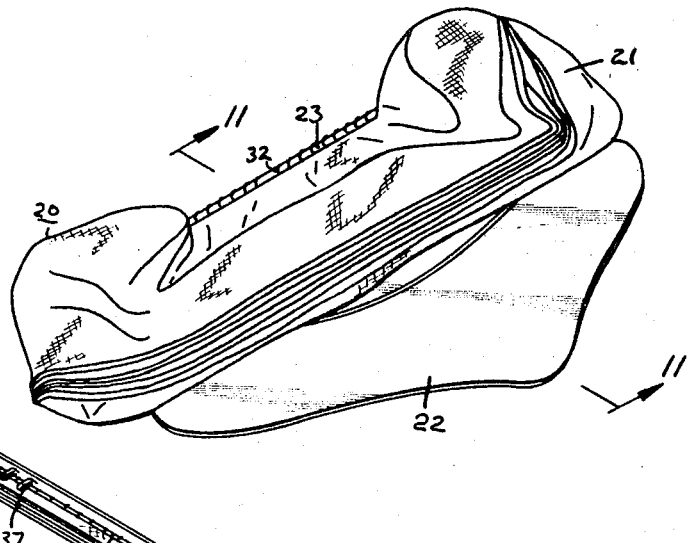
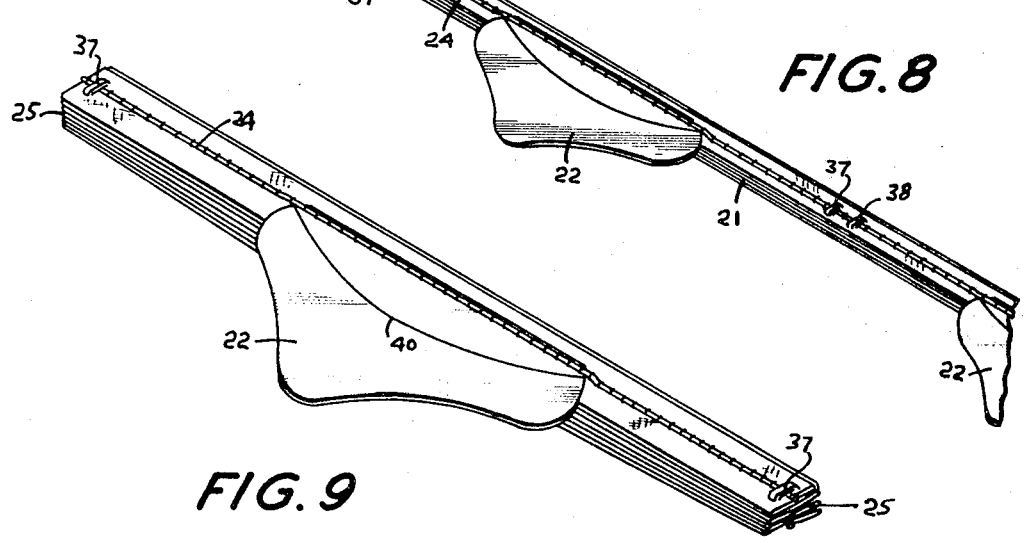
INVENTOR
GILBERT B. WAGENFELD
BY
ATTORNEY Oct. 1, 1968  G. B. WAGENFELD  3,403,409
WOMEN'S HEAD-DRESS AND METHOD OF MAKING SAME
Filed Oct. 26, 1966  3 Sheets-Sheet 2

INVENTOR
GILBERT B. WAGENFELD
BY Lew Edelson
ATTORNEY

Oct. 1, 1968          G. B. WAGENFELD          3,403,409
WOMEN'S HEAD-DRESS AND METHOD OF MAKING SAME
Filed Oct. 26, 1966          3 Sheets-Sheet 3
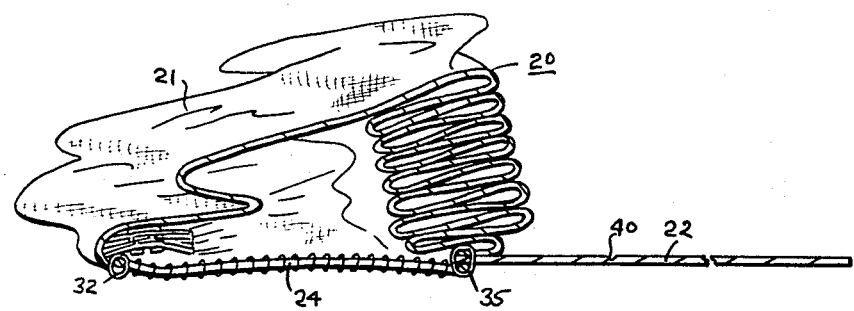
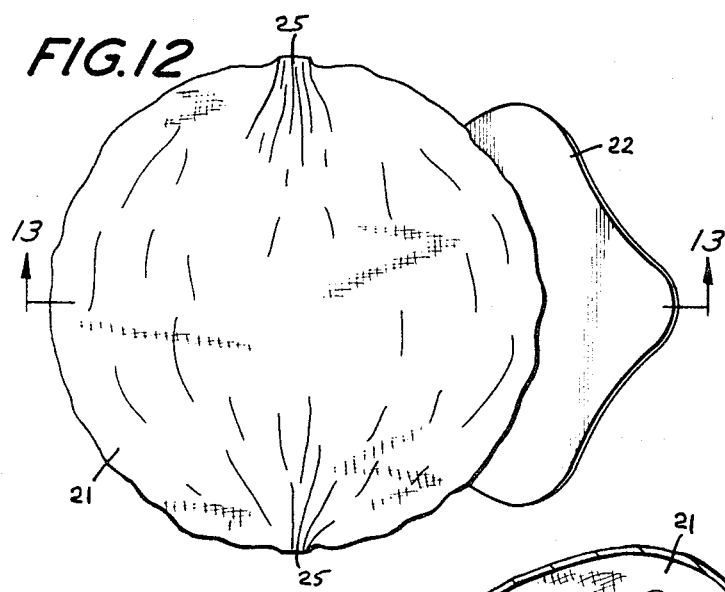
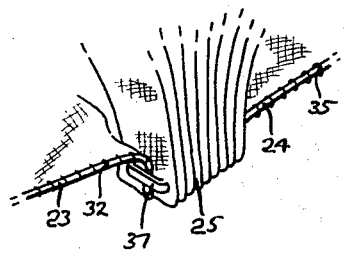
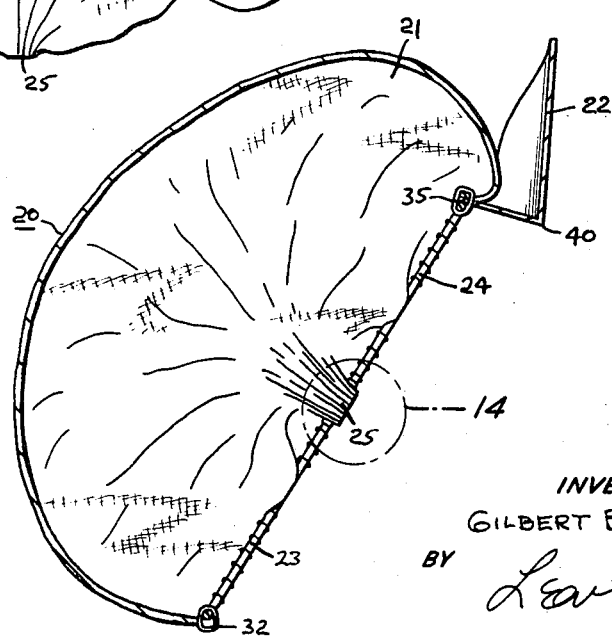
INVENTOR
GILBERT B. WAGENFELD
BY
*Leo Edelson*
ATTORNEY

United States Patent Office 3,403,409
Patented Oct. 1, 1968

3,403,409
WOMEN'S HEAD-DRESS AND METHOD OF MAKING SAME
Gilbert B. Wagenfeld, Bala Cynwyd, Pa., assignor to Cellucap Manufacturing Co., Philadelphia, Pa., a corporation of Pennsylvania
Filed Oct. 26, 1966, Ser. No. 589,733
13 Claims. (Cl. 2—198)

ABSTRACT OF THE DISCLOSURE

A low-cost disposable sanitary paper head-dress to be worn by women to cover the hair for sanitary or safety purposes wherein a plurality of such head-dresses are sequentially produced out of a continuous running length of pleated fabric which is severed at points located between locked ends of adjoining head-dresses.

---

This invention relates generally to disposable sanitary head-dress for women, and more particularly relates to such a head-dress and a method of making the same.

Head-dresses of the nature to be described have wide applicability in the food serving industry, in general factory and production facilities, and in other areas which come readily to mind. Head-dresses of the type to be described are worn for a short period of time, such as one day, and are then disposed of. Accordingly, such devices must be capable of being produced at a very low cost per unit in order that the use of these head-dresses be economically feasible. The novel head-dress according to the present invention may be formed of woven fabric such as crinoline or from a non-woven fabric or suitable paper stock. All of these materials lend themselves to the production of the novel head-dress according to the invention by means of the novel method hereinafter to be described.

A principal object of the present invention is therefore to provide a novel disposable head-dress of a type suitable for use by persons in the food industry as well as in production facilities in which it is necessary to enclose or encase the hair of personnel for sanitary or safety purposes.

Another principal object of the present invention is to provide a novel method of making a head-dress as aforesaid which results in substantial manufacturing economies by virtue of providing greatly increased production rates to thereby lower the cost per unit of such head-dresses to the ultimate consumer.

A further object of my invention is to provide such a novel head-dress by utilizing for the crown thereof a length of accordion pleated or fan-folded paper or cloth fabric to which has been secured an elastic cord under tension, the head-dress being provided in some cases with a visor.

The foregoing and other objects of the invention will become clear from a reading of the following specification in conjunction with an examination of the appended drawings, wherein:

FIGURE 1 is a side elevational view of the novel head-dress according to the invention in place on the head of a wearer;

FIGURES 2 through 9 show various sequential steps of the method of making the novel head-dress, FIGURE 9 showing the finished product;

FIGURE 10 is a perspective view of the finished head-dress according to the invention when holding-tension on the elastic cord incorporated thereinto has been released to thereby show the shape of the head-dress in relaxed form;

FIGURE 11 is a front to back longitudinal vertical sectional view through the head-dress as would be seen when viewed along the line 11—11 of FIGURE 10;

FIGURE 12 is a top plan view of the head-dress as would be seen when the latter is opened out for use;

FIGURE 13 is a front to back vertical sectional view through the opened out head-dress as would be seen when viewed along the line 13—13 of FIGURE 12; and FIGURE 14 is an enlarged fragmentary perspective view of a side securement detail of the head-dress at the region depicted in the phantom circle designated 14 in the showing of FIGURE 13.

In the several figures, like elements are denoted by like reference characters.

Figure 2:
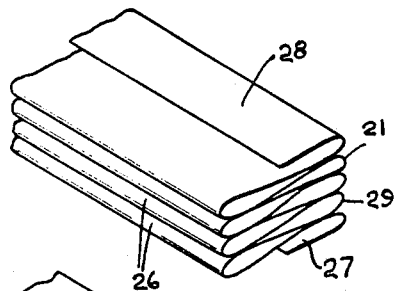

Referring now to the figures, and first to FIGURE 1, it is observed that the head-dress or cap is designated generally as 20 and includes a crown portion 21 and peak or visor 22, the crown being peripherally secured to stretched elastic cords 23 and 24 which draw the crown edges inward when in use on the head of the wearer, the ends of these elastic cords 23 and 24 being caught together at opposite sides of the crown 21 at a side securement 25. The crown portion 21 may be formed of a woven fabric such as crinoline, or from non-woven fabric or paper stock, while the visor 22 may be suitably fashioned from cardboard stock or plastic material. The elastic cords 23 and 24 may typically be cotton covered rubber, while the side securements at 25 may be effected by stapling or stitching or other type of suitable tacking. The manner in which these materials are formed into the novel head-dress according to the invention is illustrated in the showings of FIGURES 2 through 9, to which attention should now be directed.

From FIGURE 2 it is observed that the crown portion 21 of the head-dress is formed from a continuous web of material which is accordion pleated or fan folded widthwise of the web so that the web is formed with a plurality of folds or pleats 26 of uniform width arranged in a vertical stack and having a bottom flap 27 and top flap 28 each of which is approximately one-half the width of the folds or pleats 26. Typically, but only by way of illustration, each ply of the pleats 26 may be approximately three-quarters of an inch in width and the full stack may include ten or eleven such pleats 26. The web of material which is pleated or fan-folded as above described is provided with longitudinally extending parallel side edges, which edges after folding of the web maintain their parallel relationship not only in respect to each other but also in respect to the fold lines of the pleats, as appears most clearly in FIGURES 2 to 7 inclusive.

It will be appreciated that the trailing end of the pleated stack designated as 29 and the leading end of the pleated stack designated as 30 are not in fact cut-off ends, but represent arbitrarily selected points in the continuous running length of the pleated web, the pleated web in actuality extending toward the right ultimately to its supply source, while also extending to the left through various other processing devices to be subsequently described to a tensioning station which exerts a constant leftward pull on the pleated crown portion 21 to thereby maintain the pleated web in proper straight elongated tensioned condition. While the pleats 26 are generally illustrated for purposes of clarity as being somewhat vertically separated, in actuality they lie one against the other while being moved continuously to the left during the process of forming the pleated web into a finished head-dress structure.

Figure 3:
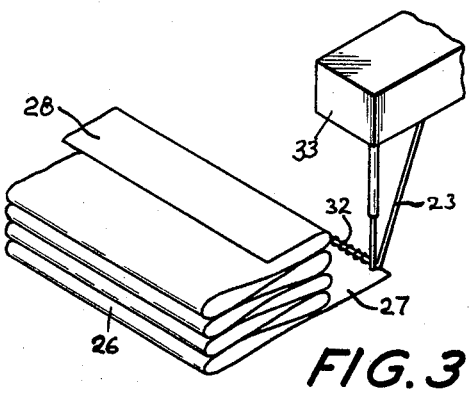
Figure 4:
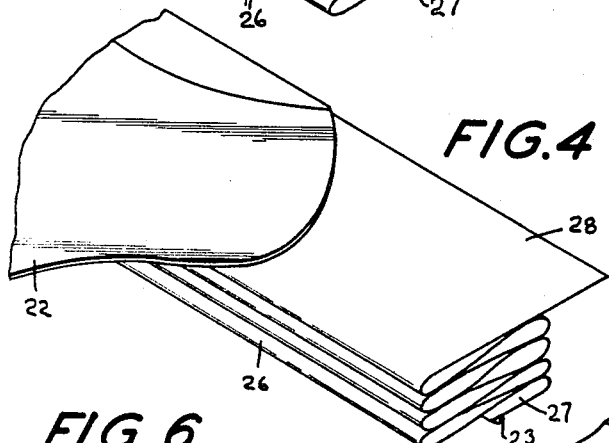

As the pleated web moves to the left, the bottom flap 27 is turned outward, as shown in FIGURE 3, the elastic cord 23 is laid along its edge under tension and is secured to the edge of the bottom flap 27 by over-edge stitching 32 provided by the stitching mechanism 33. As the pleated web crown portion 21 moves beyond the stitcher 33, the bottom flap 27 with the elastic cord 23 stitched thereto and still under tension is turned back under the stack of pleats 26 to its original position as is seen in FIGURE 4, while the top flap 28 is turned outward.

Figure 5:
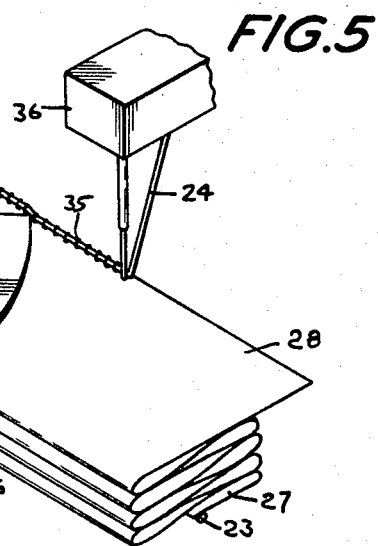
Figure 6:
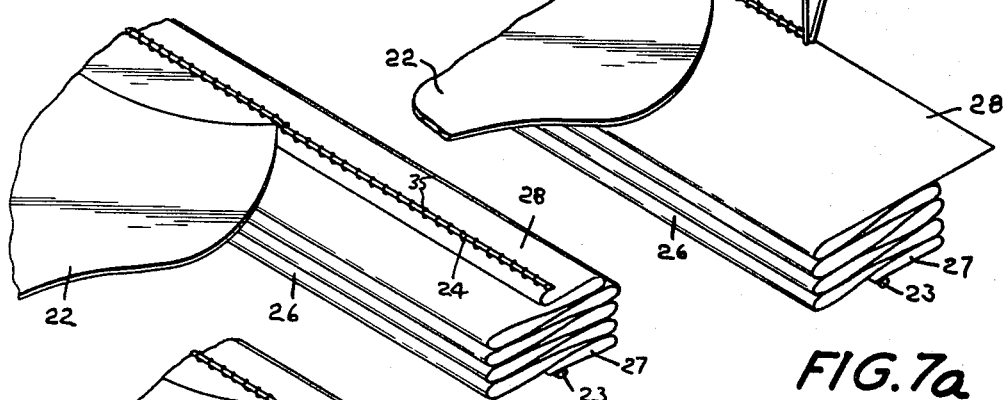

The visor 22 is now laid over the pleated crown portion 21 with the rear edge of the visor aligned with the outer edge of the top flap 28. As shown in FIGURE 5, the crown portion 21 with overlying visor 22 is next moved past an elastic supply and tensioner which lays down the elastic cord 24 over the aligned edges of the visor 22 and top flap 28, and all three are stitched together by over-edge stitches 35 effected by means of the stitcher 36. The stitched visor 22 is next shifted laterally across the pleated crown portion 21 so that the top flap 28 is drawn back again into overlying position above the stack of pleats 26, as shown in FIGURE 6, longitudinal tension being maintained constant on the pleated crown portion 21.

Figure 7:
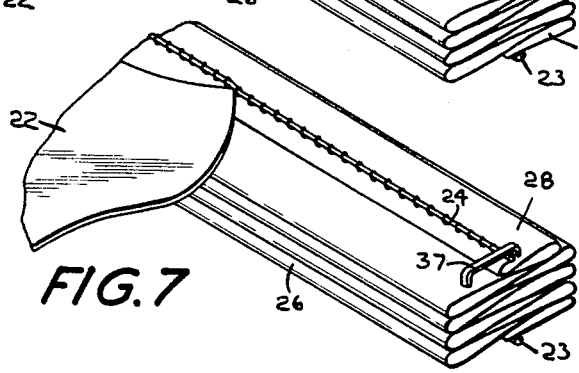
Figure 7A:
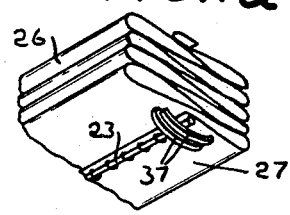

As the pleated crown portion 21 with visor attached continues its leftward movement it arrives at a securing station where staples 37 are driven vertically downward through the pleated crown portion so that the closed upper ends of the staples straddle the elastic cord 24 and the lower legs of the staples straddle and are folded over securely against the elastic cord 23 as seen in FIGURES 7 and 7a. The staples 37 are spaced longitudinally of the crown portion 21 equal distances from the visor 22 and typically approximately fifteen inches apart. The stapler is again actuated when the next completed length of crown portion 21 comes into proper position, this being at such time as the just stapled head-dress has passed beyond the last stapling station by a predetermined amount, on the order of about one-half inch. The staple again applies a set of staples, one of which is seen in the showing of FIGURE 8 and designated as 38. Also shown in FIGURE 8 is one of the pair of staples 39 which were applied prior to affixing of the staple set 37.

The final step in formation of the completed head-dress 20 is the cutting or shearing transversely across the pleated crown portion 21 between the staples 39 and 37 and between the staples 37 and 38, the end result being shown in FIGURE 9. Once the pleated crown portion 21 has been severed so that the head-dress is as shown in FIGURE 9, it is of course no longer possible to maintain the elastic cords 23 and 24 under tension and they contract longitudinally and thereby cause the head-dress to take the form shown in FIGURE 10.

The overedge stitchings 32 and 35 are most clearly seen in the showings of FIGURES 11 and 13, while the side securements at 25 are best seen in FIGURES 12, 13 and 14. From FIGURES 7 to 9 and 14, it is clearly observed that the staples 37 not only provide the side securement at 25 by holding the pleats 26 of the crown portion 21 together, but that these staples also, by virtue of their straddling position with respect to the elastic cords 23 and 24, lock the elastic cords at their ends to the side securement 25 and prevent contraction of the cords longitudinally through the over-edge stitchings 32 and 35 so that the integrity of the elastic perimeter of the crown 21 is maintained. Finally, as best seen in FIGURES 9, 11 and 14, the visor 22 is provided with an arcuate score-line 40 about which the front or peak portion of the visor may be turned back in the manner most clearly seen in the showings of FIGURES 1 and 13. Inclusion of the visor 22 is optional and in cases where the visor is not required it may be omitted without in any way altering the method of fabrication of the head-dress.

From the foregoing it will be now readily appreciated that the novel head-dress made according to the novel method of the invention is capable of being produced at very high rates of production by utilizing, if desired, automated equipment to thereby effect substantial savings in the cost of the finished article. The method of making the novel head-dress may either include as a first step the pleating of the continuous web into the stack of pleats 26, or alternatively utilizing a web which has already been prepleated. Moreover, while staples for securing the elastic cords 23 and 24 with the pleated crown have been shown and described, it is contemplated that other types of securing devices might be utilized, as for example a short line of stitching produced by a high speed stitcher. Similarly, while the crown portion 21 has been described as being formed of paper or cloth fabrics, it is within the contemplation of the invention that plastic film might also be used for the purpose of manufacturing inexpensive throw-away type shower caps or other types of head-dress which may come to mind.

Accordingly, having now described my invention in connection with a particularly illustrated embodiment thereof, it will be appreciated that modifications and variations of my invention may now naturally occur from time to time to those persons normally skilled in the art without departing from the essential scope or spirit of my invention, and it is therefore my intention to claim the same broadly as well as specifically as indicated by the appended claims.

What is claimed to be new and useful is:

1. A disposable head-dress comprising in combination, a crown portion formed from a web of fabric continuously reversely folded upon itself to form an elongated stacked plurality of pleats extending longitudinally from one end of said web to the other, which pleats are small in width compared to their length and to the length of the web forming said crown portion, elastic cords extending longitudinally the full length of said web alongside of and secured in stretched condition respectively to each of the outermost pleats of said stacked plurality of pleats, each of said elastic cords in unstretched condition being shorter than the length of web to which it is secured and being stretchable to the full length of the web forming said crown portion whereby when said elastic cords contract from their stretched to their unstretched condition the crown portion of the head-dress is peripherally reduced in size, and securement means fixedly securing together all of said stacked plurality of pleats and said elastic cords closely adjacent to each end of said folded web which forms said crown portion.

2. A disposable head-dress as defined in claim 1 wherein said plurality of pleats are of substantially equal width.

3. A disposable head-dress as defined in claim 1 wherein said plurality of pleats are of substantially equal width and are stacked directly one above another with the folded edges thereof disposed in substantially parallel planes extending normal to the flat surfaces of the pleats.

4. A disposable head-dress as defined in claim 1 wherein said web of fabric forming said crown portion is rectangular in shape when in flattened form and has opposite side edges extending longitudinally parallel to and substantially centrally of said pleats on the outer opposite faces of said stacked plurality of pleats.

5. A disposable head-dress as defined in claim 1 wherein said securement means at each end of said folded web is a staple which embraces said elastic cords and extends completely through said stacked pleats to thereby tightly compress and securely lock said pleats and elastic cords together.

6. A disposable head-dress as defined in claim 1 further including a visor portion fixedly secured to one of the outermost pleats of said crown portion midway between the opposite ends of the latter.

7. A method of sequentially producing a plurality of head-dresses from a longitudinally continuous running length of a web of fabric reversely folded upon itself widthwise to form a longitudinally extending elongated stacked plurality of pleats, consisting of the steps of, placing the pleated web in longitudinal tension, securing a stretched elastic cord to each of the outermost pleats on the opposite faces of the stacked plurality of pleats, tightly securing together against relative movement the pleats of the tensioned web and the secured stretched elastic cords at a predetermined fixed spacing interval along the length of the tensioned web, and severing the web at points lying outside of the said fixed spacing interval.

8. The method of making a disposable head-dress as defined in claim 7 wherein the securing of the stretched elastic cord to the outermost pleats within the aforesaid fixed spacing interval is carried out sequentially by securing said stretched elastic cord first to one of said outermost pleats and then to the other.

9. The method of making a disposable head-dress as defined in claim 7 wherein the said securing step is carried out by driving a staple completely through the pleated web in enclosing relationship to the said secured elastic cords.

10. The method of making a disposable head-dress as defined in claim 7 wherein the securing of the stretched elastic cord to the outermost pleats within the aforesaid fixed spacing interval is carried out sequentially by stitching one stretched elastic cord first to one web side edge of one of said outermost pleats and then by stitching another stretched elastic cord to the web opposite side edge of the other of said outermost pleats.

11. The method of making a disposable head-dress as defined in claim 7 further including the step of securing a visor to one of the outermost pleats along a portion of the latter located medially within the aforesaid fixed spacing interval simultaneously with the securing to such outermost pleat of at least a portion of said stretched elastic cord.

12. The method of making a disposable head-dress as defined in claim 10 further including the step of securing a visor to one of the outermost pleats along a portion of the latter located medially within the aforesaid fixed spacing interval simultaneously with the securing to such outermost pleat of at least a portion of said stretched elastic cord.

13. A method of sequentially producing a plurality of disposable head-dresses from a fabric web of continuous running length which consists in the steps of reversely folding said web upon itself to form an elongated plurality of pleats arranged in stacked relation, placing the pleated web in longitudinal tension between spaced points along the length thereof, securing an elastic cord while in stretched condition along each of the longitudinally extending free edges of the portion of the pleated web which extends between said spaced points, permanently locking together the stretched elastic cords and the pleats of the web to prevent relative lateral displacement thereof and separation of the pleats at points spaced apart a predetermined distance along the length of the pleated web sufficient for the production of a head-dress, and thereafter releasing the tension on the web.

References Cited
UNITED STATES PATENTS

| | | | |
|---|---|---|---|
| 1,526,322 | 2/1925 | Dehne | 2—187 |
| 2,837,746 | 6/1958 | Gundy | 2—187 |
| 2,869,135 | 1/1959 | Wagenfeld | 2—174 |

PATRICK D. LAWSON, *Primary Examiner.*

G. KRIZMANICH, *Assistant Examiner.*